US008579745B2

(12) United States Patent
Sakaue

(10) Patent No.: US 8,579,745 B2
(45) Date of Patent: Nov. 12, 2013

(54) BELT TYPE CONTINUOUSLY VARIABLE TRANSMISSION AND VEHICLE

(75) Inventor: Masaya Sakaue, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1109 days.

(21) Appl. No.: 12/013,914

(22) Filed: Jan. 14, 2008

(65) Prior Publication Data

US 2008/0168831 A1 Jul. 17, 2008

(30) Foreign Application Priority Data

Jan. 15, 2007 (JP) ................................ 2007-005671

(51) Int. Cl.
| | |
|---|---|
| F16H 57/04 | (2010.01) |
| G06F 7/00 | (2006.01) |
| G06F 17/00 | (2006.01) |
| G06F 19/00 | (2011.01) |

(52) U.S. Cl.
USPC ................................................. 474/8; 701/58

(58) Field of Classification Search
USPC ................................ 474/8, 18, 28; 701/51–68
See application file for complete search history.

(56) References Cited

U.S. PATENT DOCUMENTS

| | | | | | |
|---|---|---|---|---|---|
| 3,665,495 | A | * | 5/1972 | Carter et al. ..................... | 307/67 |
| 3,731,549 | A | * | 5/1973 | Kaiser et al. ..................... | 474/18 |
| 4,088,036 | A | * | 5/1978 | Hillman .......................... | 474/12 |
| 4,174,641 | A | * | 11/1979 | Hillman .......................... | 474/12 |
| 4,369,675 | A | * | 1/1983 | van Deursen ................... | 477/46 |
| 4,387,608 | A | * | 6/1983 | Mohl et al. ...................... | 477/49 |
| 4,446,499 | A | * | 5/1984 | Kishimoto et al. ............. | 361/92 |
| 4,458,558 | A | * | 7/1984 | Frank ........................ | 74/665 GE |
| 4,543,077 | A | * | 9/1985 | Yamamuro et al. ............. | 474/12 |
| 4,619,629 | A | * | 10/1986 | Shigematsu et al. ............ | 474/28 |
| 4,642,068 | A | * | 2/1987 | Osanai et al. ................... | 474/11 |
| 4,734,082 | A | * | 3/1988 | Tezuka ............................ | 474/28 |
| 4,959,040 | A | * | 9/1990 | Gardner et al. ............... | 474/103 |
| 4,982,822 | A | * | 1/1991 | Petzold et al. ............... | 192/3.58 |
| 5,007,147 | A | * | 4/1991 | Imai et al. ....................... | 477/43 |
| 5,014,565 | A | * | 5/1991 | Stephenson ..................... | 477/42 |
| 5,031,481 | A | * | 7/1991 | Algrain et al. .................. | 477/45 |
| 5,046,177 | A | * | 9/1991 | Vahabzadeh .................... | 701/54 |
| 5,047,937 | A | * | 9/1991 | Vahabzadeh et al. ........... | 701/54 |
| 5,279,381 | A | * | 1/1994 | Fukuda ......................... | 180/190 |

(Continued)

FOREIGN PATENT DOCUMENTS

| | | |
|---|---|---|
| JP | 04-210156 | 7/1992 |
| JP | 07-158706 | 6/1995 |

*Primary Examiner* — William A Rivera
*Assistant Examiner* — Henry Liu
(74) *Attorney, Agent, or Firm* — Rabin & Berdo, P.C.

(57) ABSTRACT

A control device for a belt type continuously variable transmission of a vehicle such as a motorcycle includes a first storage section for storing in advance reference correlation between a position of a movable flange and a detection value of a flange position detection sensor. A first processing section moves the movable flange to a position where its movement is restricted by a restriction section. A detection value of the flange position detection sensor is stored in a second storage section. A second processing section derives correlation between the position of the movable flange and the detection value of the flange position detection sensor based on the detection value of the flange position detection sensor stored in the second storage section and the reference correlation between the position of the movable flange and the detection value of the flange position detection sensor stored in the first storage section. A detection value of the flange position detection sensor is thereby calibrated.

21 Claims, 10 Drawing Sheets

(56) References Cited

U.S. PATENT DOCUMENTS

| | | | |
|---|---|---|---|
| 5,310,384 A * | 5/1994 | Siemon | 474/70 |
| 5,366,416 A * | 11/1994 | Roovers et al. | 474/18 |
| 5,427,579 A * | 6/1995 | Kanehara et al. | 474/28 |
| 5,431,602 A * | 7/1995 | Hendriks et al. | 474/28 |
| 5,514,047 A * | 5/1996 | Tibbles et al. | 477/46 |
| 5,871,411 A * | 2/1999 | Senger et al. | 474/11 |
| 5,967,918 A * | 10/1999 | Knapp et al. | 474/28 |
| 5,993,338 A * | 11/1999 | Kato et al. | 474/12 |
| 6,047,230 A * | 4/2000 | Spencer et al. | 701/57 |
| 6,219,608 B1 * | 4/2001 | Abo et al. | 701/51 |
| 6,315,693 B1 * | 11/2001 | Tayama | 477/46 |
| 6,553,263 B1 * | 4/2003 | Meadows et al. | 607/61 |
| 6,622,075 B1 * | 9/2003 | Reuschel et al. | 701/51 |
| 6,813,551 B2 * | 11/2004 | Taniguchi et al. | 701/59 |
| 2002/0155910 A1 * | 10/2002 | Nishizawa et al. | 474/69 |
| 2005/0037876 A1 * | 2/2005 | Unno et al. | 474/12 |
| 2005/0107942 A1 * | 5/2005 | Nomura et al. | 701/100 |
| 2005/0233842 A1 * | 10/2005 | Shioiri et al. | 474/19 |
| 2006/0073924 A1 * | 4/2006 | Izumi et al. | 474/28 |
| 2006/0172829 A1 * | 8/2006 | Ishio | 474/18 |

* cited by examiner

BELT TYPE CONTINUOUSLY VARIABLE TRANSMISSION AND VEHICLE

RELATED APPLICATIONS

This application claims the benefit of priority under 35 USC 119 of Japanese patent application no. 2007-005671, filed on Jan. 15, 2007, which application is hereby incorporated by reference in its entirety.

BACKGROUND OF THE INVENTION

1. Field of the Invention

The present invention relates to a belt type continuously variable transmission and an engine including a belt type continuously variable transmission.

2. Description of Related Art

A belt type continuously variable transmission includes a primary sheave and a secondary sheave, each having a groove with a variable width. The primary sheave is mounted on a primary shaft to which an output from a power source such as an engine is input, and the secondary sheave is mounted on a secondary shaft from which an output for a driving wheel is output. The primary and secondary sheaves are each made up of a fixed flange and a movable flange defining a V-groove therebetween. Each movable flange movable in an axial direction of the primary or secondary shaft. A V-belt is wound around both sheaves. The gear ratio of the belt type continuously variable transmission is varied by moving the movable flange to vary the groove widths of both the sheaves.

Some V-belt type continuously variable transmissions include a control device for controlling an actuator for moving the movable flange of the primary sheave. The control device calculates a target gear ratio based on vehicle information such as throttle opening degree and vehicle speed, for example. In order to move the movable Range to a target position, the control device sends a control signal to the actuator to control the position of the movable flange. Such V-belt type automatic continuously variable transmissions are applied, for example, to vehicles such as motorcycles (see JP-B-3043061, for example).

The continuously variable transmissions in JP-A-Hei 7-158706 include a position sensor for detecting the position of the movable flange. JP-A-Hei 7-158706 discloses that factors such as variations in output characteristics of the position sensor, changes over time in the characteristics, and elongation and wear of the V-belt impair the consistency of the correlation between the value detected by the position sensor and the position of the movable flange. JP-A-Hei 7-158706 further discloses self-correction of data of the impaired consistency of the correlation based on the ratio between the speeds of the primary and secondary sheaves.

The continuously variable transmission of JP-A-Hei 7-158706 is subject to the influence of dimensional tolerances of the mechanism, variations that occur during the assembly, and so forth, because of the construction that the position of the flange is detected by the sensor. Therefore, the control device needs to be adjusted so as to be able to correctly control the flange based on the detection value of the sensor after assembly of the sensor and the mechanism for moving the flange. Such adjustment needs to be made for each vehicle and after each maintenance such as replacement of the belt. Therefore, the adjustment is desirably made in a simpler way.

SUMMARY OF THE INVENTION

In a belt type continuously variable transmission in accordance with the present invention, a belt is wound around a primary sheave and a secondary sheave each having a pair of flanges axially movable relative to each other. A flange position detection sensor detects a position of the flange. A restriction section restricts movement of the flange at one end of a movable range of the flange. A control device controls the position of the flange based on a detection value of the flange position detection sensor. The control device includes a first storage section for storing in advance reference correlation between the position of the flange and the detection value of the flange position detection sensor. A first processing section moves the flange to a position where movement of the flange is restricted by the restriction section, and stores a detection value of the flange position detection sensor detected with the flange moved to that position in a second storage section. A second processing section derives correlation between the position of the flange in the belt type continuously variable transmission and the detection value of the flange position detection sensor based on the detection value of the flange position detection sensor stored in the second storage section and the reference correlation between the position of the flange and the detection value of the flange position detection sensor stored in the first storage section.

When the first storage section stores a reference change amount of the detection value of the flange position detection sensor corresponding to movement of the flange from one end to the other end of the movable range, for example, the detection value of the flange position detection sensor with the flange moved to the other end of the movable range can be derived by adding the reference change amount stored in the first storage section to the detection value caused to be stored in the second storage section by the first processing section.

In this case, the control device preferably includes a third storage section for storing the detection value of the flange position detection sensor derived by the second processing section. The control device preferably further includes a third processing section for detecting that the flange has moved to the other end of the movable range based on the detection value of the flange position detection sensor stored in the third storage section.

In addition, the first processing section may determine that the flange has moved to the position where movement of the flange is restricted by the restriction section based on a fact that there is no change in the detection value of the flange position detection sensor in a process to move the flange to the position where movement of the flange is restricted by the restriction section.

In addition, the first and second processing sections may be enabled in a mode separate from a running mode performed during driving operation.

In addition, the restriction section may define the one end of the movable range of the flange on a side where a gear ratio of the belt type continuously variable transmission is LOW.

The control device may also includes a fourth processing section for moving the flange to a side where the gear ratio of the belt type continuously variable transmission is TOP to hold the belt between the pair of flanges after a process performed by the first processing section to move the flange to the position where movement of the flange is restricted by the restriction section.

The control device may also include a fourth storage section for storing a tolerable range of the detection value of the flange position detection sensor detected with the flange moved to the position where movement of the flange is restricted by the restriction section; and a first abnormality detection section for detecting an abnormality in a case where the detection value caused to be stored in the second storage section by the first processing section is outside the tolerable range stored in the fourth storage section.

The control device may include a second abnormality detection section for detecting an abnormality when the detection value of the flange position detection sensor keeps changing, in a process to move the flange to the position where movement of the flange is restricted by the restriction section, for a predetermined time or longer since the process was started.

The control device may include a third abnormality detection section for detecting an abnormality when the detection value of the flange position detection sensor keeps changing, in a process to move the flange to the side where the gear ratio of the belt type continuously variable transmission is TOP, for a predetermined time or longer since the process was started.

The control device may include a sensing section for sensing an abnormality of a mechanism for moving the flange or the Range position detection sensor; and an abnormality sensing information storage section for storing information of the abnormality sensed by the sensing section, and the first processing section or the second processing section may be enabled when no information of a sensed abnormality is stored in the abnormality sensing information storage section.

The control device may include a control section for sending an operation signal to an electric motor for moving the flange; a voltage sensor for sensing a voltage of a battery for supplying electricity to the electric motor; a fifth storage section for storing a tolerable range of a value of the voltage sensed by the voltage sensor; and a fourth abnormality detection section for detecting an abnormality when the battery voltage sensed by the voltage sensor is outside the tolerable range of the voltage value stored in the fifth storage section.

The control device may include a correction section for correcting the detection value of the flange position detection sensor in the reference correlation based on a proportion of $\Delta A/\Delta B$ when the gear ratio of the belt type continuously variable transmission has become a predetermined gear ratio, $\Delta A$ being an actual change amount of the flange position detection sensor with reference to the position where movement of the flange is restricted by the restriction section, and $\Delta B$ being a change amount of the flange position detection sensor calculated based on the reference correlation between the position of the flange and the detection value of the flange position detection sensor.

The primary and secondary sheaves may each include a fixed flange and a movable flange respectively mounted on a rotary shaft. The movable flange of the secondary sheave may be urged in a direction of reducing a width of a groove of the secondary sheave, and the control device may control movement of the movable flange of the primary sheave so as to adjust the groove widths of the primary sheave and the secondary sheave.

The flange position detection sensor may be an angle sensor mounted on a rotary shaft for rotation in conjunction with a mechanism for moving the flange.

The belt type continuously variable transmission disclosed above may be provided to a vehicle such as a motorcycle, a straddle type vehicle, a scooter type vehicle, a golf cart or a four-wheeled buggy.

According to the belt type continuously variable transmission of the present invention, the control device can be adjusted so as to be able to correctly control the flange based on the detection value of the sensor with a simple configuration. In addition, when the first abnormality detection section, the second abnormality detection section, the third abnormality detection section, or the fourth abnormality detection section is provided, each abnormality detection section can detect an abnormality of the belt type continuously variable transmission along with the adjustment by the control device. When the correction section is provided, the control accuracy of the belt type continuously variable transmission is improved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
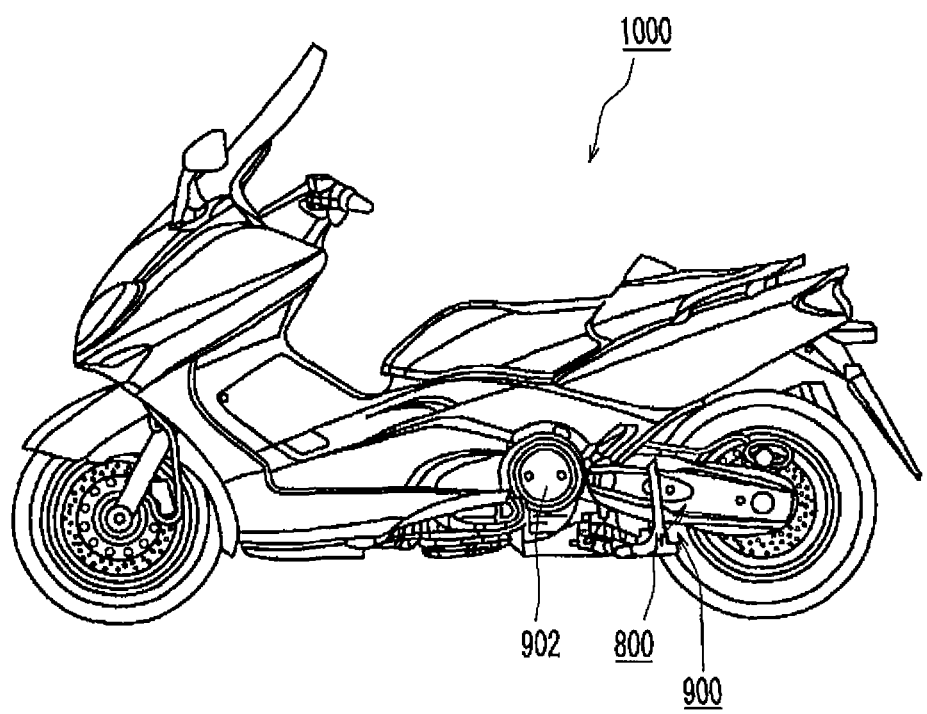
FIG. 1 is a side view of a motorcycle having a belt type continuously variable transmission in accordance with an embodiment of the present invention.

A belt type continuously variable transmission in accordance with an embodiment of the present invention is now described with reference to the drawings. In the drawings, the same reference numeral is given to members and parts having the same function. It should be understood that the present invention is not limited to the embodiment described below.

Figure 2:
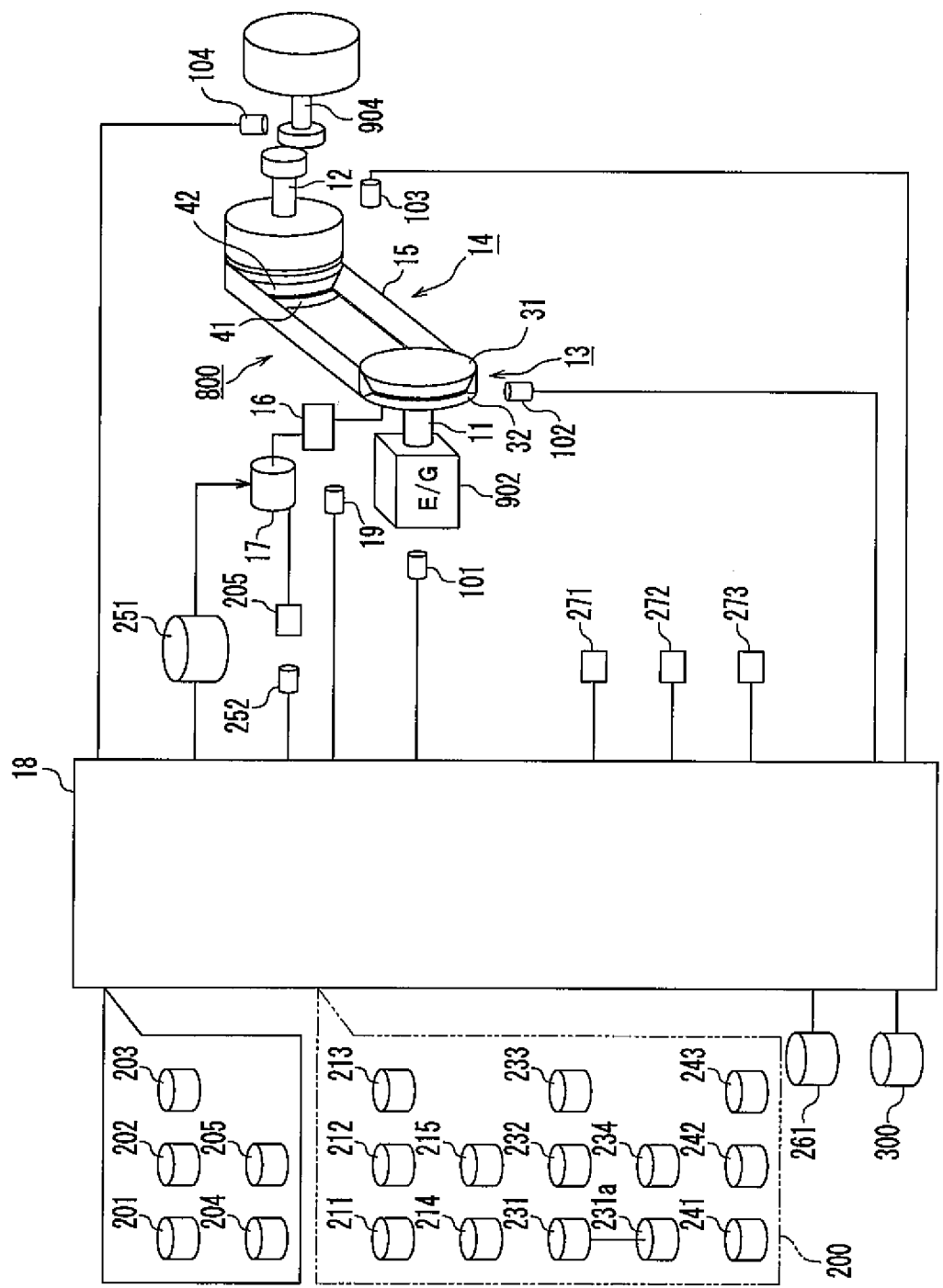
FIG. 2 is a schematic diagram of the belt type continuously variable transmission in accordance with the embodiment of the present invention.

As shown in FIG. 1, a belt type continuously variable transmission 800 is provided to a power unit 900 of a motorcycle 1000. As shown in FIG. 2, belt type continuously variable transmission 800 includes a primary shaft 11, a secondary shaft 12, a primary sheave 13, a secondary sheave 14, a V-belt 15, a groove width adjustment mechanism 16, an actuator 17, a control device 18, and a flange position detection sensor 19.

Figure 3:
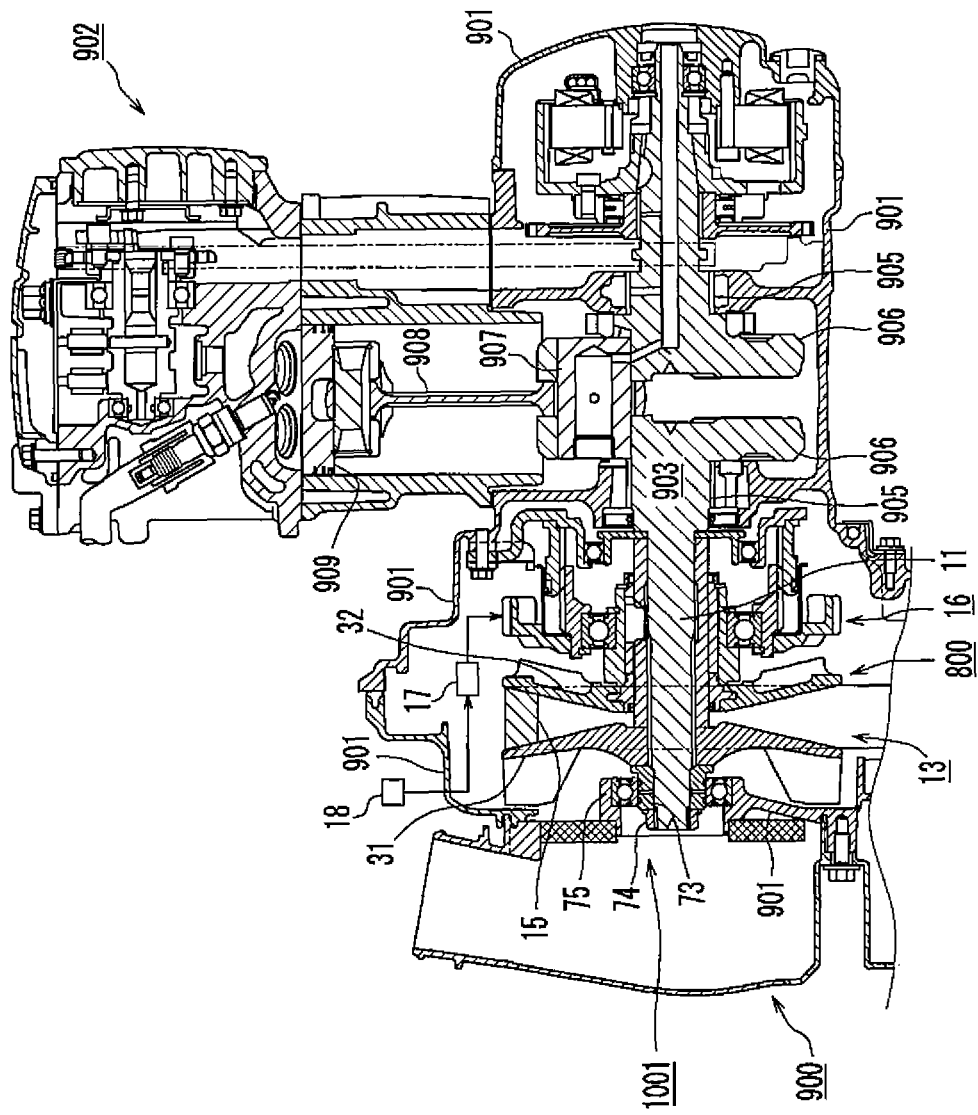
FIG. 3 is a partial cross sectional view of a primary sheave side of the belt type continuously variable transmission in accordance with the embodiment of the present invention.
Figure 4:
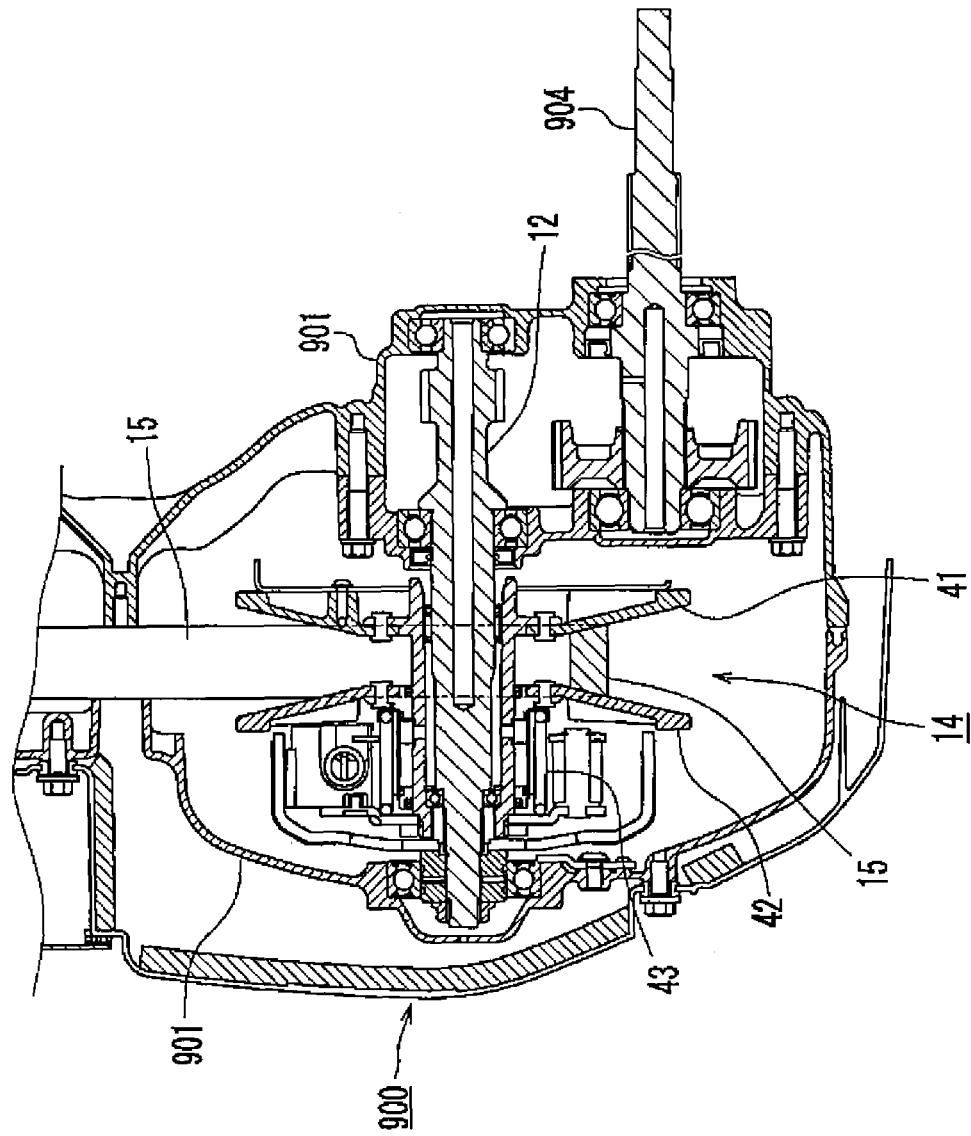
FIG. 4 is a partial cross sectional view of a secondary sheave side of the belt type continuously variable transmission in accordance with the embodiment of the present invention.

As shown in FIGS. 3 and 4, primary shaft 11 and secondary shaft 12 are mounted to a case 901 of power unit 900 via bearings. Primary shaft 11 is formed integrally with a crankshaft 903 as an output shaft of an engine 902. Secondary shaft 12 is disposed in parallel to primary shaft 11 and coupled to a drive shaft 904. Various members including a crank journal 905, a crank web 906, a crank pin 907, a connecting rod 908, and a piston 909 are coupled to crankshaft 903.

Primary sheave 13 and secondary sheave 14 each includes a fixed flange (31, 41) and a movable flange (32, 42) respectively mounted on a rotary shaft (primary shaft 11 and secondary shaft 12). Movable flange 42 of secondary sheave 14 is urged in a direction of reducing the groove width of secondary sheave 14. Movement of movable flange 32 of primary sheave 13 is controlled by control device 18. Fixed flange (31, 41) and movable flange (32, 42) define a V-groove for receiving a belt therebetween. V-belt 15 is wound through the V-grooves of primary sheave 13 and secondary sheave 14 to transmit rotational driving force between both sheaves (13, 14). Movement of movable flange (32, 42) in the axial direction of primary shaft 11 and secondary shaft 12 varies the groove width of the V-grooves, which varies the gear ratio of belt type continuously variable transmission 800.

Groove width adjustment mechanism 16 moves movable flange 32 of primary sheave 13 to adjust the groove width of primary sheave 13. Actuator 17 drives groove width adjustment mechanism 16. In this embodiment, the groove width of primary sheave 13 is adjusted by moving movable flange 32 of primary sheave 13 with actuator 17.

Primary sheave 13 and groove width adjustment mechanism 16 are both mounted on primary shaft 11. A spline 51 is formed on primary shaft 11, and male threads 52 for attachment of a locknut 74 are formed at an end of primary shaft 11.

Figure 5:
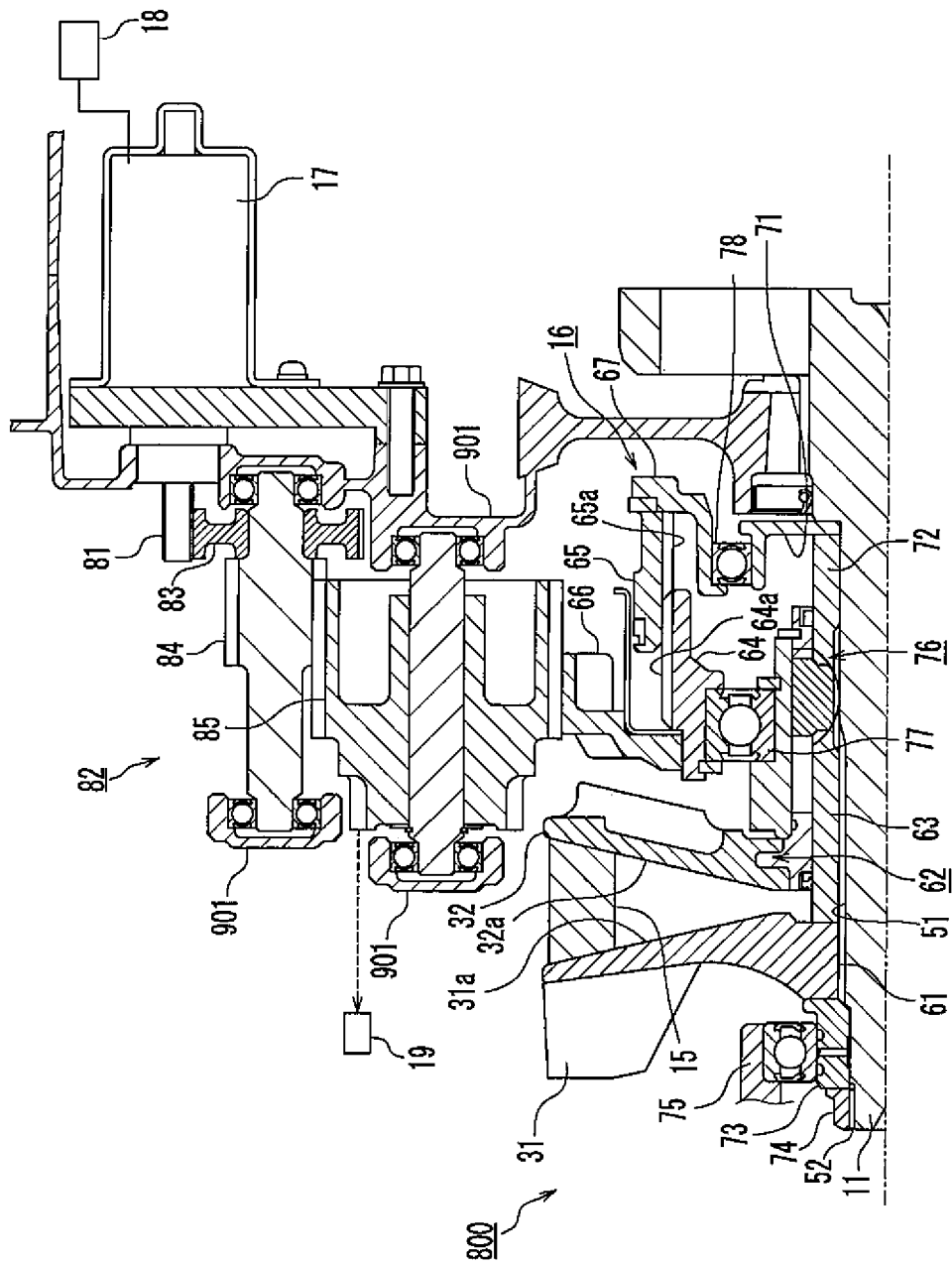
FIG. 5 is a cross sectional view showing a primary sheave of the belt type continuously variable transmission in accordance with the embodiment of the present invention.

As shown in FIG. 5, primary sheave 13 is made up of fixed flange 31 and movable flange 32. Fixed flange 31 is fixed on the distal end side, and movable flange 32 is disposed on the base end side so as to be axially movable relative to primary shaft 11. In this embodiment, fixed flange 31 and movable flange 32 of primary sheave 13 are each a generally disk-shaped member, and respectively have circular conical surfaces 31a, 32a facing each other in the axial direction. The respective circular conical surfaces 31a, 32a of fixed flange 31 and movable flange 32 define a V-groove for receiving V-belt 15 therebetween.

An insertion hole 61 for receiving primary shaft 11 therethrough is formed at the center of fixed flange 31, and a spline for engagement with spline 51 of primary shaft 11 is formed on the inner peripheral surface of insertion hole 61. A mount part 62 for attachment to groove width adjustment mechanism 16 is formed at the center of movable flange 32. Groove width adjustment mechanism 16 includes a slider 63, a feed member 64, a guide member 65, a gear 66 and a fixed support member 67. Primary sheave 13 and groove width adjustment mechanism 16 are mounted on primary shaft 11 by a rotary support member 71, a first sleeve 72, a second sleeve 73 and a locknut 74.

Rotary support member 71, first sleeve 72, fixed flange 31, second sleeve 73 and locknut 74 are sequentially mounted on primary shaft 11. First sleeve 72 and fixed flange 31 are meshed with spline 51 of primary shaft 11 to rotate together with primary shaft 11. Second sleeve 73 is mounted on primary shaft 11 with an end in abutment with fixed flange 31. Locknut 74 is screwed on male threads 52 formed at an end of primary shaft 52. The end of primary shaft 11 is rotatably supported by a bearing 75 mounted between second sleeve 73 and case 901.

First sleeve 72 includes a guide mechanism 76 disposed along the axial direction. Slider 63 of groove width adjustment mechanism 16 is mounted to first sleeve 72 so as to be movable along the axial direction by means of guide mechanism 76. Movable flange 32 is mounted to slider 63. Feed member 64 and gear 66 are mounted to slider 63 via a bearing 77. Male threads 64a are formed on the outer peripheral surface of feed member 64, and are meshed with female threads 65a formed on the inner peripheral surface of guide member 65 fixed to case 901.

Guide member 65 of groove width adjustment mechanism 16 is mounted via a bearing 78 to rotary support member 71 mounted on primary shaft 11, and mounted to fixed support member 67 fixed to case 901. Thus, guide member 65 is fixed to case 901 so as not to rotate as primary shaft 11 rotates.

In this embodiment, an electric motor is used as actuator 17. An output shaft 81 of electric motor 17 transmits power to gear 66 via a plurality of gears 83-85 of a gear transmission mechanism 82. Gears 83-85 are mounted to case 901 of power unit 900 via bearings. Gear transmission mechanism 82 decelerates the output of electric motor 17, and transmits the power to gear 66 of groove width adjustment mechanism 16.

As shown in FIG. 2, the output of electric motor 17 is controlled by electricity supplied to electric motor 17 based on a control signal of control device 18. The electricity supplied to electric motor 17 may be controlled in a PWM (Pulse Wide Modulation) method, for example. In the PWM method, the output of electric motor 17 is controlled by varying the ON/OFF time ratio (duty ratio) of electric motor 17 with the voltage of the supplied electricity kept constant. The output of electric motor 17 may be controlled in ways other than the PWM method as long as it is controlled suitably. For example, the output of electric motor 17 may be controlled by varying the voltage of the supplied electricity in an analog fashion.

Electric motor 17 is electrically connected to control device 18 (gearshift control device). Control device 18 comprises an electronic control unit (ECU) that includes a calculation section (microcomputer (MPU)) and a storage section (memory), for example. Control device 18 receives vehicle information from various sensors mounted on the vehicle.

Movable flange 32 moves in the axial direction together with slider 63 as electric motor 17 rotates with feed member 64 meshed with guide member 65. The position of movable flange 32 is detected by flange position detection sensor 19.

Figure 6:
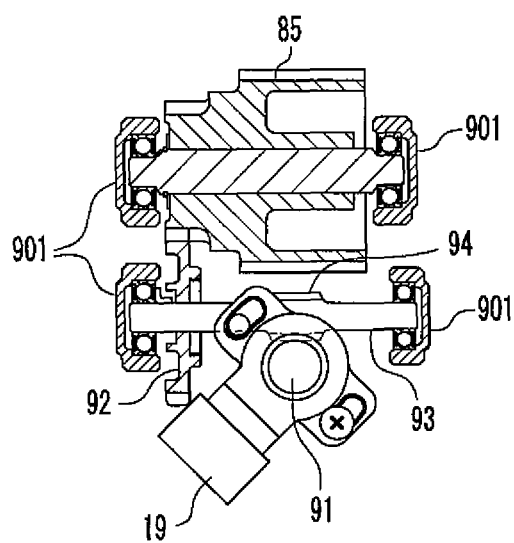
FIG. 6 is a partial cross sectional view of a mounting structure of a potentiometer of the belt type continuously variable transmission in accordance with the embodiment of the present invention.

As shown in FIG. 6, flange position detection sensor 19 comprises a potentiometer 19 (angle sensor) mounted on a rotary shaft for rotation in conjunction with the mechanism for moving the flange (groove width adjustment mechanism 16). A rotary shaft 91 of potentiometer 19 is meshed with a worm 94 formed on a gear shaft 93 of a gear 92 for meshing engagement with gear 85 of gear transmission mechanism 82. Potentiometer 19 is mounted to case 901 of power unit 900. The resistance value of potentiometer 19 is varied according to the operation amount of electric motor 17. There is correlation among the detection value of potentiometer 19, the position of movable flange 32, the operation amount of electric motor 17, and the gear ratio of belt type continuously variable transmission 800. Therefore, potentiometer 19 can detect not only the position of movable flange 32 of primary sheave 13, but also the operation amount of electric motor 17 and the gear ratio of belt type continuously variable transmission 800.

Figure 7:
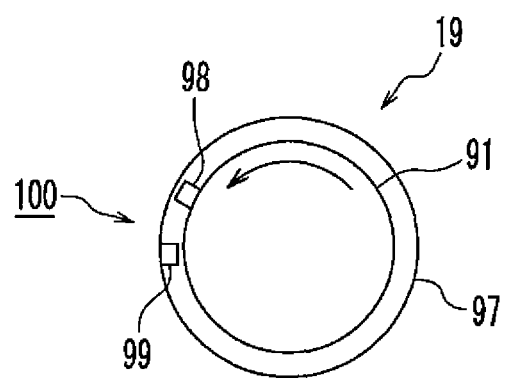
FIG. 7 shows a restriction section in accordance with the embodiment of the present invention.
Figure 8:
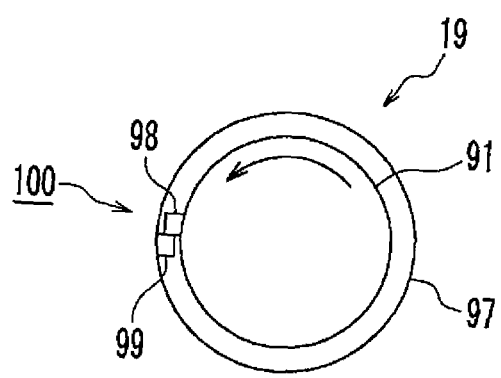
FIG. 8 shows the restriction section with a stopper in abutment in accordance with the embodiment of the present invention.

Groove width adjustment mechanism 16 includes a restriction section 100 for restricting movement of movable flange 32 to define one end of the movable range of movable flange 32. Restriction section 100 restricts movement of movable flange 32 on a side where the groove width of primary sheave 13 is larger (where the gear ratio of belt type continuously variable transmission 800 is LOW). Restriction section 100 includes a stopper in each of gear 66 and fixed support member 67. Specifically, a rib is provided to the back side of gear 66, and a projection is provided to fixed support member 67. Restriction section 100 is shown schematically in FIG. 7. Rotation of gear 66 moves movable flange 32. When a rib 98 provided to the back side of gear 66 and a projection 99 mounted to fixed support member 67 are in abutment with each other as shown in FIG. 8, movement of movable flange 32 is restricted. Rib 98 provided to the back side of gear 66 and projection 99 mounted to fixed support member 67 are in abutment with each other when movable flange 32 is moved to the side where the gear ratio is LOW. Restriction section 100 defines an end of the movable range of movable flange 32 on the LOW side.

Potentiometer 19 is mounted to gear transmission mechanism 82 with stoppers 98, 99 restricting movement of movable flange 32 on the side where the gear ratio of belt type continuously variable transmission 800 is LOW. In this state, potentiometer 19 is mounted to gear transmission mechanism 82 and sensor calibration is performed. Therefore, the detection value of potentiometer 19 is generally constant in the state where the gear ratio of belt type continuously variable transmission 800 is LOW.

Control device 18 controls the position of movable flange 32 based on the detection value of potentiometer 19 (flange position detection sensor). Specifically, control device 18 calculates a target gear ratio of belt type continuously variable transmission 800 as a control target according to a preset program based on received vehicle information. Control device 18 then calculates an operation amount of electric motor 17 based on the detection value of potentiometer 19, the correlation between the detection value of potentiometer 19 and the gear ratio of belt type continuously variable transmission 800, the correlation between the detection value of potentiometer 19 and the operation amount of electric motor 17, or the like, such that the gear ratio of belt type continuously variable transmission 800 will become the target gear ratio. Control device 18 then outputs an operation signal to electric motor 17 based on the calculated operation amount of electric motor 17. In this way, control device 18 controls the position of movable flange 32.

In addition, as shown in FIG. 2, various sensors such as a throttle position sensor (TPS) 101, an engine speed sensor 102 and vehicle speed sensors 103, 104 are electrically connected to control device 18, aside from flange position detection sensor 19 described above, so that information on various states of the vehicle can be obtained from the various sensors. Throttle position sensor (TPS) 101 senses the accelerator opening degree (throttle opening degree). Engine speed sensor 102 senses the engine speed, and in this embodiment is constituted of a sensor for sensing the speed of the crankshaft primary shaft 11). Vehicle speed sensors 103, 104 detect the vehicle speed. Sensor 103 may sense the speed of secondary shaft 12, and sensor 104 may sense the speed of drive shaft 904, for example.

In order for control device 18 to accurately control the gear ratio of belt type continuously variable transmission 800, the position of movable flange 32 should be recognized as accurately as possible based on the detection value of potentiometer 19 (flange position detection sensor). However, the detection value of potentiometer 19 is subject to the influence of dimensional tolerances of the mechanism, variations that occur during, the assembly, and so forth, because of the construction that the position of the flange is detected by potentiometer 19. Therefore, the detection value of potentiometer 19 must be calibrated in order to eliminate the influence of dimensional tolerances of the mechanism, variations that occur during the assembly, and so forth. Such calibration needs to be performed after the assembly of potentiometer 19 and the mechanism for moving movable flange 32. Such calibration also needs to be made for each vehicle and after each maintenance such as replacement of the belt.

Control device 18 includes a first storage section 201, a second storage section 202, a first processing section 211 and a second processing section 212 in order to perform such calibration.

Figure 9:
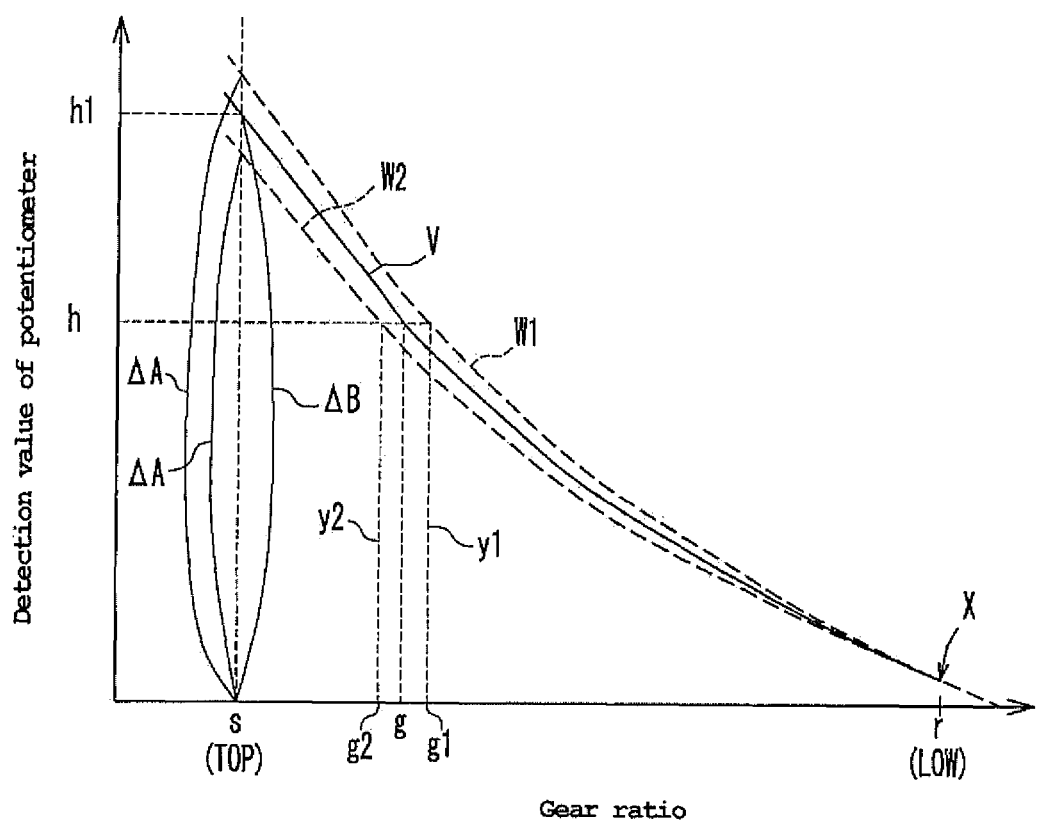
FIG. 9 is a graph showing a correlation between a detection value of the potentiometer and a gear ratio of the belt type continuously variable transmission in accordance with the embodiment of the present invention.

First storage section 201 stores in advance reference correlation between the position of movable flange 32 and the detection value of potentiometer 19. In one embodiment, first storage section 201 stores a reference change amount of the detection value of potentiometer 19 corresponding to movement of movable flange 32 from one end to the other end of its movable range. As shown in FIG. 9, the change amount in design of the detection value of potentiometer 19 corresponding to movement over the entire movable range of movable flange 32 is stored as the reference correlation between the position of movable flange 32 and the detection value of potentiometer 19. In addition, first storage section 201 stores the change amount in design of the detection value of potentiometer 19 corresponding to movement of movable flange 32 from the position where movement of movable flange 32 is restricted by stoppers 98, 99 (restriction section) provided on the side where the gear ratio of belt type continuously variable transmission 800 is LOW to the operation limit position of movable flange 32 on the side where the gear ratio of belt type continuously variable transmission 800 is TOP.

Second storage section 202 stores the detection value of potentiometer 19 detected with movable flange 32 moved to the position where movement of movable flange 32 is restricted by stoppers 98, 99 (restriction section).

First processing section 211 performs a process to move movable flange 32 to the position where movement of movable flange 32 is restricted by stoppers 98, 99 (restriction section), and to cause second storage section 202 to store the detection value of potentiometer 19 detected with movable flange 32 moved to that position.

First processing section 211 drives electric motor 17 to move movable flange 32 so as to make the groove width of primary sheave 13 larger. Then, first storage section 211 detects that movable flange 32 has moved to the position where movement of movable flange 32 is restricted by stoppers 98, 99 (restriction section) based on the fact that there is no change in the detection value of potentiometer 19 for a predetermined time. This allows sensing that movable flange 32 has moved to the position where movement of movable flange 32 is restricted by stoppers 98, 99. Then, the detection value of potentiometer 19 is stored in second storage section 202 at the timing of the sensing.

Second processing section 212 derives correlation between the position of movable flange 32 and the detection value of potentiometer 19 based on the detection value caused to be stored in second storage section 202 by first processing section 211 and the reference correlation between the position of movable flange 32 and the detection value of potentiometer 19 stored in first storage section 201. This eliminates the influence of dimensional tolerances of the mechanism, variations that occur during the assembly, and so forth. Thus, the accuracy of the gear ratio control for belt type continuously variable transmission 800 is improved by controlling the position of movable flange 32 based on the correlation derived by second processing section 212, compared to the case where no such processes are performed by first processing section 211 and second processing section 212.

The detection value of potentiometer 19 detected with movable flange 32 moved to the position where movement of movable flange 32 is restricted by stoppers 98, 99 by first processing section 211 is varied among vehicles because of dimensional tolerances of the mechanism, variations that occur during the assembly, and so forth. Therefore, the detection value stored in second storage section 202 is varied among vehicles because of dimensional tolerances of the mechanism, variations that occur during the assembly, and so forth. First storage section 201 stores the reference change amount of the detection value of potentiometer 19 corresponding to movement of movable flange 32 from one end to the other end of its movable range as the reference correlation between the position of movable flange 32 and the detection value of potentiometer 19. Second processing section 212 then adds the reference change amount stored in first storage section 201 to the detection value caused to be stored in second storage section 202 by first processing section 211. That is, the detection value of potentiometer 19 at the time when movable flange 32 is moved to the other end of its movable range can be derived by adding the reference change amount of the detection value of potentiometer 19 corresponding to movement of movable flange 32 from the one end to the other end of its movable range to the detection value of potentiometer 19 detected with movable flange 32 moved to the position where movement of movable flange 32 is restricted by stoppers 98, 99 (restriction section).

Specifically, the change amount in design of the detection value of potentiometer 19 corresponding to movement of movable flange 32 over its entire movable range is stored. Thus, the correlation between the position of movable flange 32 and the detection value of potentiometer 19 over the entire movable range of movable flange 32 can be derived, as shown in FIG. 9, by adding the change amount in design stored in first storage section 201 to the detection value caused to be stored in second storage section 202 by first processing section 211. In addition, first storage section 201 stores the change amount in design of the detection value of potentiometer 19 corresponding to movement of movable flange 32 from the position where movement of movable flange 32 is restricted by stoppers 98, 99 provided on the side where the gear ratio of belt type continuously variable transmission 800 is LOW to the operation limit position of movable flange 32 on the side where the gear ratio of belt type continuously variable transmission 800 is TOP. Therefore, second processing section 212 can obtain information on the detection value of potentiometer 19 for the operation limit position on the TOP side of belt type continuously variable transmission 800 by adding the change amount in design stored in first storage section 201 to the detection value caused to be stored in second storage section 202 by first processing section 211. In this embodiment, control device 18 can obtain information on the detection value of potentiometer 19 for the operation limit position on the TOP side of belt type continuously variable transmission 800, although there is no stopper for restricting movement of movable flange 32 on the side where the gear ratio of belt type continuously variable transmission 800 is TOP.

The processes of first processing section 211 and second processing section 212 described above may be performed even with the engine not operating. For example, the processes may be performed before assembly of belt type continuously variable transmission 800 to an actual vehicle.

Control device 18 includes a third storage section 203 for storing the detection value of potentiometer 19 derived by second processing section 212. This allows storing the detection value of potentiometer 19 for the operation limit position with movable flange 32 at the other end of its movable range (in this embodiment, on the TOP side of belt type continuously variable transmission 800). Control device 18 preferably additionally includes a third processing section 213 for detecting that movable flange 32 has moved to the other end of its movable range based on the detection value of potentiometer 19 stored in third storage section 203. Thus, movable flange 32 can be prevented from moving further than the operation limit position by stopping movable flange 32 at the operation limit position.

As described above, restriction section 100 is provided at only one end of the movable range of movable flange 32, and the detection value of potentiometer 19 detected with movable flange 32 moved to the position where movement of movable flange 32 is restricted by restriction section 100 is varied among vehicles. However, it is possible to derive the detection value of potentiometer 19 with movable flange 32 moved to the operation limit position at the other end of its movable range, and thus to obtain detection values of potentiometer 19 with movable flange 32 at both the ends of its movable range for each vehicle. This allows determination of the range of the detection value of potentiometer 19 corresponding to the movable range of movable flange 32, and thus allows movable flange 32 to operate appropriately. For example, it is preferable to set detection values of potentiometer 19 at positions r and s where belt type continuously variable transmission 800 is LOW and TOP, respectively, as shown in FIG. 9. In this embodiment, position r where belt type continuously variable transmission 800 is LOW is set to a position slightly to the TOP side from the position of abutment with stoppers 98, 99. In addition, position s where belt type continuously variable transmission 800 is TOP is set to a position slightly to the LOW side from the operation limit position on the TOP side.

The processes of first processing section 211 and second processing section 212 are performed in a mode separate from a running mode 300 performed during driving operation. Here, running mode 300 is a control program to be executed in order to drive the vehicle, and driving operation information includes accelerator operation information and other information such as vehicle speed. Control device 18 has a check mode 200 for checking belt type continuously variable transmission 800, in addition to running mode 300. The processes of first processing section 211 and second processing section 212 described above are performed in check mode 200.

Check mode 200 is a control program executed in order to maintain or check belt type continuously variable transmission 800. First processing section 211 and second processing section 212 are enabled in check mode, which is separate from running mode 300, to prevent first processing section 211 and second processing section 212 from being enabled by the rider by mistake during driving operation. Control device 18 is preferably set to check mode 200 also during production, maintenance and other processes in a factory, to enable first processing section 211 and second processing section 212 and to calibrate the detection value of potentiometer 19. This check mode is merely an example, and any mode that is separate from the running mode may be used. For example, a mode for calibrating the detection value of potentiometer 19 may be used.

Control device 18 also includes a fourth processing section 214 for moving movable flange 32 to the side where the gear ratio of belt type continuously variable transmission 800 is TOP to hold belt 15 between flanges 31, 32 after the process performed by first processing section 211 to move movable flange 32 to the position where movement of movable flange 32 is restricted by restriction section 100.

The process of fourth processing section 214 causes belt 15 to be held between flanges 31, 32 after the process of first processing section 211, and thus belt 15 and primary sheave 13 can thereafter be prevented from slipping relative to each other when the engine is operated in a driving mode or the like.

Control device 18 also includes a fourth storage section 204 and a first abnormality detection section 231. Fourth storage section 204 stores the tolerable range of the detection value of potentiometer 19 detected with movable flange 32 moved to the position where movement of movable flange 32 is restricted by restriction section 100. First abnormality detection section 231 detects an abnormality in the case where the detection value caused to be stored in second storage section 202 by first processing section 211 is outside the tolerable range stored in fourth storage section 204.

That is, first processing section 211 causes the detection value of potentiometer 19 detected with movable flange 32 moved to the position where movement of movable flange 32 is restricted by restriction section 100 to be stored in second storage section 202. Fourth storage section 204 stores the tolerable range of the detection value of potentiometer 19 in such a state. First abnormality detection section 231 includes a determination section 231a for determining whether the detection value of potentiometer 19 stored in second storage section 202 is within the tolerable range stored in fourth storage section 204. Then, when determination section 231a determines that the detection value of potentiometer 19 stored in second storage section 202 is not within the tolerable range stored in fourth storage section 204, an abnormality is detected. That is, when first abnormality detection section 231 detects an abnormality, abnormalities such as assembly failure of belt type continuously variable transmission 800, abnormality of potentiometer 19, and abnormality failure of potentiometer 19 can be detected.

Control device 18 also includes a second abnormality detection section 232 for detecting an abnormality when the detection value of potentiometer 19 keeps changing, in the process to move movable flange 32 to the position where movement of movable flange 32 is restricted by restriction section 100, for a predetermined time or longer since the process was started.

When the detection value of potentiometer 19 keeps changing for a predetermined time or longer since the process to move movable flange 32 to the position where movement of movable flange 32 is restricted by restriction section 100 was started, there can be considered abnormalities such as defect of stoppers 98, 99 (restriction section), abnormality of potentiometer 19, and assembly failure of potentiometer 19, for example. Second abnormality detection section 232 offers the possibility of detecting such abnormalities. In this embodiment, the process to move movable flange 32 to the position where movement of movable flange 32 is restricted by restriction section 100 is performed by first processing section 211. Thus, second abnormality detection section 232 can detect an abnormality in the process of first processing section 211, and therefore no special processing operation is required.

Control device 18 also includes a third abnormality detection section 233 for detecting an abnormality when the detection value of potentiometer 19 keeps changing, in the process to move movable flange 32 to the side where the gear ratio of belt type continuously variable transmission 800 is TOP, for a predetermined time or longer since the process was started.

When the detection value of potentiometer 19 keeps changing for a predetermined time or longer since the process to move movable flange 32 to the side where the gear ratio of belt type continuously variable transmission 800 is TOP was started, abnormalities such as assembly of no belt, abnormality of potentiometer 19 (flange position detection sensor), and assembly failure of potentiometer 19, for example, can be considered. Third abnormality detection section 233 offers the possibility of detecting such abnormalities. In this embodiment, the process to move movable flange 32 to the side where the gear ratio of belt type continuously variable transmission 800 is TOP is performed by fourth processing section 214. Thus, third abnormality detection section 233 can detect an abnormality in the process of fourth processing section 214, and therefore no special processing operation is required.

Control device 18 also includes a sensing section 241 for sensing an abnormality of the mechanism for moving flanges 31, 32 or potentiometer 19, and an abnormality sensing information storage section 242 for storing information of the abnormality sensed by sensing section 241. Control device 18 also includes a determination section 243 for determining whether information of a sensed abnormality is stored in abnormality sensing information storage section 242. Control device 18 enables first processing section 211 or second processing section 212 when no information of a sensed abnormality is stored in abnormality sensing information storage section 242.

That is, there may be a case where the mechanism for moving flanges 31, 32 such as groove width adjustment mechanism 16 and potentiometer 19 do not operate normally. For example, dust may clog groove width adjustment mechanism 16 or the mechanism for moving the rotary shaft of potentiometer 19 as potentiometer 19 to hinder flanges 31, 32 from operating normally or to hinder potentiometer 19 from functioning normally. Sensing section 241 senses such an abnormality, and information of the sensed abnormality is stored in abnormality sensing information storage section 242. In the case of such an abnormality, the user needs to carry out maintenance. In the case of such an abnormality, there is a possibility that the process of first processing section 211 or second processing section 212 (calibration process for control based on the detection value of potentiometer 19) may not be performed normally.

Control device 18 determines whether information of a sensed abnormality is stored in abnormality sensing information storage section 242. When information of a sensed abnormality is stored in abnormality sensing information storage section 242, the process of first processing section 211 or second processing section 212 is not performed. When no information of a sensed abnormality is stored in abnormality sensing information storage section 242, the process of first processing section 211 or second processing section 212 is performed.

As described above, the process of first processing section 211 or second processing section 212 is performed when no information of a sensed abnormality is stored in abnormality sensing information storage section 242, and when the user has carried out maintenance to erase information of a sensed abnormality stored in abnormality sensing information storage section 242. This reliably prevents the process of first processing section 211 or second processing section 212 from being performed in the case of an abnormality.

Control device 18 also includes a control section 251 for controlling actuator 17, a voltage sensor 252, a fifth storage section 205 and a fourth abnormality detection section 234. Control section 251 sends an operation signal to electric motor 17 for moving movable flange 32. Voltage sensor 252 senses the voltage of a battery for supplying electricity to electric motor 17. Fifth storage section 205 stores the tolerable range of the value of the voltage sensed by voltage sensor 252. Fourth abnormality detection section 234 detects an abnormality in the case where the battery voltage sensed by voltage sensor 252 is outside the tolerable range of the voltage value stored in fifth storage section 205.

The case where the battery voltage sensed by voltage sensor 252 is outside the tolerable range of the voltage value stored in fifth storage section 205 includes the case where the battery voltage is lower than the predetermined tolerable range, where the electric motor may be started normally. Fourth abnormality detection section 234 can detect such abnormalities.

Figure 10:
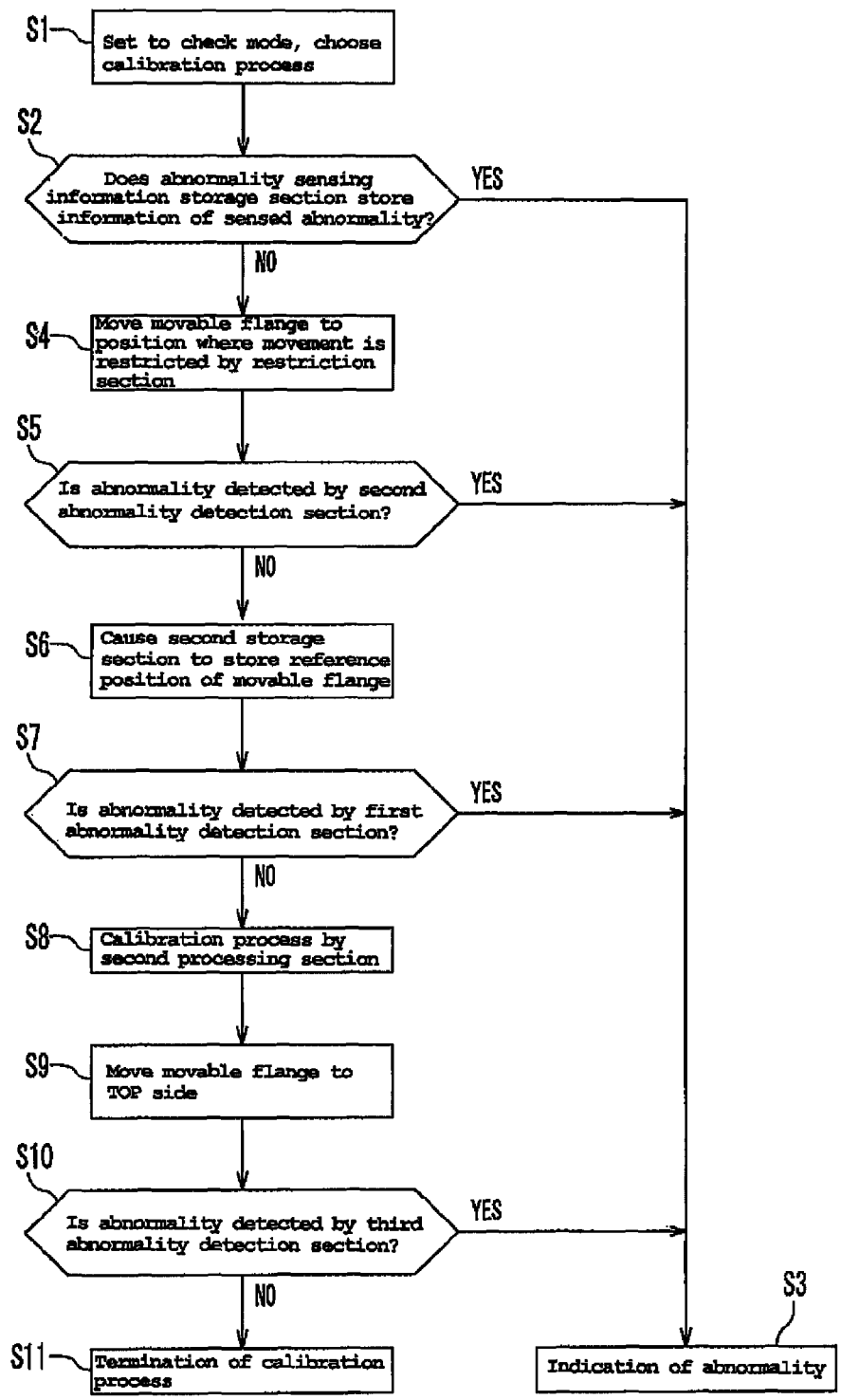
FIG. 10 is a control flowchart of a control device of the belt type continuously variable transmission in accordance with the embodiment of the present invention.

In order to perform the calibration work described above, first, control device 18 is set to check mode 200 to allow choosing a calibration process (S1), as shown in FIGS. 2 and 10. In this embodiment, control device 18 is set to check mode 200 after turning ON a main switch 271. Check mode 200 provides a plurality of menus including a calibration process menu to choose from. In order to perform the calibration process, the operator chooses the calibration process menu.

When the calibration process menu is chosen, determination section 243 determines whether information of a sensed abnormality is stored in abnormality sensing information storage section 242 (S2). When information of a sensed abnormality is stored in abnormality sensing information storage section 242 (YES), the operator is informed of the abnormality (S3: indication of abnormality). In this embodiment, an indicator 273 is caused to flash on and off quickly to inform the operator of an abnormality.

When no information of a sensed abnormality is stored in abnormality sensing information storage section 242 (NO), the calibration process menu is chosen to start the calibration process. In this embodiment, the calibration process is started by choosing the calibration process menu in check mode 200, and then turning ON an engine stop switch 272 from the OFF state. Once the calibration process is started, indicator 273 starts flashing on and off slowly to inform the operator that the calibration process has been started.

Control device 18 moves movable flange 32 to the position where movement of movable flange 32 is restricted by restriction section 100 (S4). Control device 18 sends an operation signal to electric motor 17 in the process of first processing section 211, to move movable flange 32 of primary sheave 13 to the side where the groove width of primary sheave 13 is larger. Then, control device 18 stops movable flange 32 on sensing that movable flange 32 has moved to the position where movement of movable flange 32 is restricted by stoppers 98, 99 (restriction section) based on the fact that there is no change in the detection value of potentiometer 19 for a predetermined time.

At this time, abnormality detection is performed by second abnormality detection section 232 (S5). That is, second abnormality detection section 232 detects an abnormality when the detection value of potentiometer 19 keeps changing, in the process to move movable flange 32 to the position where movement of movable flange 32 is restricted by restriction section 100, for a predetermined time or longer since the process was started. When second abnormality detection section 232 detects an abnormality (YES), the calibration process is suspended and indicator 273 is caused to flash on and off quickly to inform the operator of the abnormality (S3: indication of abnormality).

When second abnormality detection section 232 detects no abnormality (NO), second storage section 202 is caused to store the reference position of movable flange 32 (S6). That is, first processing section 211 causes the detection value of potentiometer 19 detected with movable flange 32 moved to the position where movement of movable flange 32 is restricted by restriction section 100 to be stored in second storage section 202. Then, abnormality detection is performed by first abnormality detection section 231 (S7). That is, an abnormality is detected when the detection value of potentiometer 19 stored in second storage section 202 is outside the tolerable range of the detection value of potentiometer 19 detected with movable flange 32 moved to the position where movement of movable flange 32 is restricted by restriction section 100 and stored in fourth storage section 204.

When first abnormality detection section 231 detects an abnormality (YES), the calibration process is suspended and indicator 273 is caused to flash on and off quickly to inform the operator of the abnormality (S3: indication of abnormality). When first abnormality detection section 231 detects no abnormality (NO), second processing section 212 performs a calibration process (S8). This allows calibration of control based on the detection value of potentiometer 19.

(Abnormality Detection with Third Abnormality Detection Section)

Then, control device 18 moves movable flange 32 to the TOP side (S9). This causes belt 15 to be held in the V-groove of primary sheave 13. At this time, abnormality detection is performed by third abnormality detection section 233 (S10). That is, third abnormality detection section 233 detects an abnormality when the detection value of potentiometer 19 keeps changing, in the process to move movable flange 32 to the side where the gear ratio of belt type continuously variable transmission 800 is TOP, for a predetermined time or longer since the process was started. When third abnormality detection section 233 detects an abnormality (YES), the calibration process is suspended and indicator 273 is caused to flash on and off quickly to inform the operator of the abnormality (S3: indication of abnormality).

When third abnormality detection section 233 detects no abnormality (NO), the calibration process is terminated normally (S11). The flashing of indicator 273 is stopped to inform the operator of the termination of the calibration process.

As has been described above, in this embodiment, control based on the detection value of potentiometer 19 is calibrated with reference to the detection value of potentiometer 19 with movable flange 32 at the position where movement of movable flange 32 is restricted by stoppers 98, 99 (restriction section), and based on the reference correlation between the position of movable flange 32 and detection value of potentiometer 19. The flow described above merely illustrates an embodiment of the present invention, and the order of respective processes and so forth may be changed suitably. For example, the processes of storing the reference position (S6) and calibration of the operation range (S8) may be performed in the case where none of first abnormality detection section 231 to third abnormality detection section 233 detects an abnormality.

When there are variations in the output characteristics of potentiometer 19, performing only the calibration described above leaves a possibility that the position of movable flange 32 deviates from a target value in the case where the position of movable flange 32 is controlled based on the detection value of potentiometer 19.

For example, when the detection value of potentiometer 19 that is output is higher than the design value, detection value w1 of potentiometer 19 for a gear ratio deviates to be higher than given by reference correlation v, as shown in FIG. 9. In this case, control device 18 calculates a detection value h of potentiometer 19 in accordance with target gear ratio g based on reference correlation v for target gear ratio g. Then, control device 18 actually calculates an operation amount of electric motor 17 based on detection value h of potentiometer 19, to operate electric motor 17. Therefore, the gear ratio of belt type continuously variable transmission 800 is controlled to a gear ratio g1, which is deviated to the LOW side from target gear ratio g, as indicated by y1.

When the detection value of potentiometer 19 that is output is lower than the design value, detection value w2 of potentiometer 19 for a gear ratio deviates to be lower than given by reference correlation v, as shown in FIG. 9. In this case, control device 18 calculates a detection value h of potentiometer 19 in accordance with target gear ratio g based on reference correlation v for target gear ratio g. Then, control device 18 actually calculates an operation amount of electric motor 17 based on detection value h of potentiometer 19, to operate electric motor 17. Therefore, the gear ratio of belt type continuously variable transmission 800 is controlled to a gear ratio g2, which is deviated to the TOP side from target gear ratio g, as indicated by y2.

Control device 18 includes a correction section 261 for correcting such deviation. Correction section 261 corrects the detection value of potentiometer 19 in reference correlation v based on the proportion of $\Delta A/\Delta B$ when the gear ratio of belt type continuously variable transmission 800 has become a predetermined gear ratio, $\Delta A$ being an actual change amount of potentiometer 19 with reference to the position where movement of movable flange 32 is restricted by restriction section 100, and $\Delta B$ being a change amount of potentiometer 19 calculated based on reference correlation v between the position of movable flange 32 and the detection value of potentiometer 19.

As shown in FIG. 9, control device 18 stores in advance a predetermined gear ratio s for TOP. Predetermined gear ratio s for TOP is necessary to set a control target value in controlling the gear ratio of belt type continuously variable transmission 800. Correction section 261 corrects reference correlation v based on the proportion of $\Delta A/\Delta B$, $\Delta A$ being a change amount of the detection value of potentiometer 19 at the time when belt type continuously variable transmission 800 has become the predetermined gear ratio for TOP, and $\Delta B$ being a change amount of the detection value of potentiometer 19 derived based on reference correlation v.

This makes reference correlation v closer to the actual correlation (w1, w2) not only in the TOP region but also over the entire region from LOW to TOP. This makes the actual gear ratio of belt type continuously variable transmission 800 controlled by control device, 18 closer to the target gear ratio, thereby improving control accuracy.

Such correction is preferably performed with an engine and so forth assembled to belt type continuously variable transmission 800, the engine actually operating, and the gear ratio of belt type continuously variable transmission 800 manipulated. For example, control device 18 may automatically perform the above correction in an inspection process during a shipment inspection in a factory, where the gear shift of belt type continuously variable transmission 800 is inspected with the engine operating. Alternatively, the correction may be automatically performed while a rider is driving a vehicle provided with belt type continuously variable transmission 800 after the shipment. The correction may be performed at any gear ratio that is not close to LOW, and may not necessarily be performed at the predetermined gear ratio s for TOP.

For example, the correction may be performed at a predetermined gear ratio for the middle position between LOW and TOP. Also in this case, reference correlation v can be corrected based on the proportion of $\Delta A/\Delta B$ in a similar manner so as to make reference correlation v closer to actual correlation (w1, w2) over the entire region from LOW to TOP, compared to the case where such correction is not performed. Alternatively, for example, reference correlation v may be corrected based on the detection value of potentiometer 19 at a plurality of positions including the middle position between LOW and TOP at shipment from or at maintenance in a factory. This makes reference correlation v closer to actual correlation (w1, w2) with more accuracy. It is not desirable to perform correction based on the detection value of potentiometer 19 at the middle position between LOW and TOP during running, because of the influence of acceleration and so forth.

Although a belt type continuously variable transmission in accordance with an embodiment of the present invention has been described above, the belt type continuously variable transmission in accordance with the present invention is not limited to the embodiment described above.

For example, the construction of belt type continuously variable transmission 800, the structure of groove width adjustment mechanism 16, the structure of flange position detection sensor 19, the configuration of control device 18, and so forth are not limited to those disclosed in the above embodiment.

Although belt type continuously variable transmission 800 is provided to a power unit of a motorcycle by way of example in the above embodiment, belt type continuously variable transmission 800 may be applied to various types of vehicles other than motorcycles. For example, belt type continuously variable transmission 800 may be applied to a wide range of vehicles such as straddle type vehicles, scooter type vehicles, golf carts and four-wheeled buggies. Moreover, although belt type continuously variable transmission 800 is provided to a power unit by way of example, belt type continuously variable transmission 800 may be provided separately from an engine.

As described above, the belt type continuously variable transmission and the control method therefor in accordance with the present invention can be widely utilized for belt type continuously variable transmissions provided to vehicles or the like.

The invention claimed is:

1. A belt type continuously variable transmission comprising:
   a primary sheave and a secondary sheave each having a pair of flanges axially movable relative to each other, at least one of the flanges of the primary sheave being a movable flange;
   a belt wound around the sheaves;
   a flange position detection sensor for detecting a position of the movable flange;
   a restriction section for restricting movement of the movable flange at one end of a movable range of the movable flange; and
   a control device for controlling the position of the movable flange in a running mode based on a detection value of the flange position detection sensor, the control device including
      a first storage section for storing in advance reference correlation between the position of the movable flange and the detection value of the flange position detection sensor,
      a first processing section for moving the movable flange to a position in a check mode different from the running mode where movement of the movable flange is restricted by the restriction section, and for storing a detection value of the flange position detection sensor detected with the movable flange moved to that position in a second storage section, and a second processing section in the check mode for deriving correlation between the position of the movable flange in the belt type continuously variable transmission and the detection value of the flange position detection sensor based on the detection value of the flange position detection sensor stored in the second storage section by the first processing section and the reference correlation between the position of the movable flange and the detection value of the flange position detection sensor stored in the first storage section.

2. The belt type continuously variable transmission according to claim 1, wherein the first storage section stores a reference change amount of the detection value of the flange position detection sensor corresponding to movement of the movable flange from the one end to the other end of the movable range, and the second processing section derives a detection value of the flange position detection sensor with the movable flange moved to the other end of the movable range by adding the reference change amount stored in the first processing section to the detection value caused to be stored in the second storage section by the first processing section.

3. The belt type continuously variable transmission according to claim 2, the control device comprising:

a third storage section for storing the detection value of the flange position detection sensor derived by the second processing section.

4. The belt type continuously variable transmission according to claim 3, the control device comprising:

a third processing section for detecting that the movable flange has moved to the other end of the movable range based on the detection value of the flange position detection sensor stored in the third storage section.

5. The belt type continuously variable transmission according to claim 1, wherein the first processing section determines that the movable flange has moved to the position where movement of the movable flange is restricted by the restriction section when there is no change in the detection value of the flange position detection sensor in a process to move the movable flange to the position where movement of the movable flange is restricted by the restriction section.

6. The belt type continuously variable transmission according to claim 1, wherein the restriction section defines the one end of the movable range of the movable flange on a side where a gear ratio of the belt type continuously variable transmission is LOW.

7. The belt type continuously variable transmission according to claim 6, the control device comprising:

a fourth processing section for moving the movable flange to a side where the gear ratio of the belt type continuously variable transmission is TOP to hold the belt between the pair of flanges of the primary sheave after a process performed by the first processing section to move the movable flange to the position where movement of the movable flange is restricted by the restriction section.

8. The belt type continuously variable transmission according to claim 1, the control device comprising:

a fourth storage section for storing a tolerable range of the detection value of the flange position detection sensor detected with the movable flange moved to the position where movement of the movable flange is restricted by the restriction section; and a first abnormality detection section for detecting an abnormality when the detection value stored in the second storage section by the first processing section is outside the tolerable range stored in the fourth storage section.

9. The belt type continuously variable transmission according to claim 1, the control device comprising:

a second abnormality detection section for detecting an abnormality when the detection value of the flange position detection sensor keeps changing, in a process to move the movable flange to the position where movement of the movable flange is restricted by the restriction section, for a predetermined time or longer since the process was started.

10. The belt type continuously variable transmission according to claim 7, the control device comprising:

a third abnormality detection section for detecting an abnormality when the detection value of the flange position detection sensor keeps changing, in a process to move the movable flange to the side where the gear ratio of the belt type continuously variable transmission is TOP, for a predetermined time or longer since the process was started.

11. The belt type continuously variable transmission according to claim 1, the control device comprising:

a sensing section for sensing an abnormality of a mechanism for moving the movable flange or the flange position detection sensor; and an abnormality sensing information storage section for storing information of the abnormality sensed by the sensing section, wherein the first processing section or the second processing section is enabled in a case where no information of a sensed abnormality is stored in the abnormality sensing information storage section.

12. The belt type continuously variable transmission according to claim 1, the control device comprising:

a control section for sending an operation signal to an electric motor for moving the movable flange;

a voltage sensor for sensing a voltage of a battery for supplying electricity to the electric motor;

a fifth storage section for storing a tolerable range of a value of the voltage sensed by the voltage sensor; and a fourth abnormality detection section for detecting an abnormality when the battery voltage sensed by the voltage sensor is outside the tolerable range of the voltage value stored in the fifth storage section.

13. The belt type continuously variable transmission according to claim 1, the control device comprising:

a correction section for correcting the reference correlation based on an actual detection value of the flange position detection sensor at a plurality of predetermined gear ratios.

14. The belt type continuously variable transmission according to claim 1, wherein:

the primary sheave also includes a fixed flange and the secondary sheave includes a fixed flange and a movable flange, each sheave being respectively mounted on a rotary shaft, and the movable flange of the secondary sheave is urged in a direction of reducing a width of a groove of the secondary sheave, and the control device controls movement of the movable flange of the primary sheave so as to adjust the groove widths of the primary sheave and the secondary sheave.

15. The belt type continuously variable transmission according to claim 1, wherein the flange position detection sensor is an angle sensor mounted on a rotary shaft for rotation in conjunction with a mechanism for moving the movable flange.

16. A vehicle comprising the belt type continuously variable transmission according to claim 1.

17. The vehicle according to claim 1, wherein the vehicle is a motorcycle, a straddle type vehicle, a scooter type vehicle, a golf cart or a four-wheeled buggy.

18. A vehicle comprising the belt type continuously variable transmission according to claim 1, wherein the running mode is only executed during a driving operation of the vehicle, and the check mode is only executed during a non-driving operation of the vehicle.

19. A belt type continuously variable transmission comprising:
- a primary sheave and a secondary sheave each having a pair of flanges axially movable relative to each to each other, at least one of the primary sheave being a movable flange;
- a belt wound around the sheaves;
- a flange position detection sensor for detecting a position of the movable flange;
- a restriction section for restricting movement of the movable flange at one end of a movable range of the movable flange; and
- a control device for controlling the position of the movable flange based on a detection value of the flange position detection sensor, the control device including
  - a first storage section for storing in advance reference correlation between the position of the movable flange and the detection value of the flange position detection sensor,
  - a first processing section for moving the movable flange to a position where movement of the movable flange is restricted by the restriction section, and for storing a detection value of the flange position detection sensor detected with the movable flange moved to that position in a second storage section,
  - a second processing section for deriving correlation between the position of the movable flange in the belt type continuously variable transmission and the detection value of the flange position detection sensor based on the detection value of the flange position detection sensor stored in the second storage section by the first processing section and the reference correlation between the position of the movable flange and the detection value of the flange position detection sensor stored in the first storage section, and
  - a correction section for correcting the detection value of the flange position detection sensor in the reference correlation based on a proportion of $\Delta A/\Delta B$ when the gear ratio of the belt type continuously variable transmission has become a predetermined gear ratio, $\Delta A$ being an actual change amount of the flange position detection sensor with reference to the position where movement of the movable flange is restricted by the restriction section, and $\Delta B$ being a change amount of the flange position detection sensor calculated based on the reference correlation between the position of the movable flange and the detection value of the flange position detection sensor.

20. A control device for a belt type continuously variable transmission having
- a primary sheave and a secondary sheave each having a pair of flanges axially movable relative to each other, at least one of the flanges of the primary sheave being a movable flange;
- a belt wound around the sheaves;
- a flange position detection sensor for detecting a position of the movable flange; and
- a restriction section for restricting movement of the movable flange at one end of a movable range of the movable flange, the control device in a running mode controlling the position of the movable flange based on a detection value of the flange position detection sensor and including
  - a first storage section for storing in advance reference correlation between the position of the movable flange and the detection value of the flange position detection sensor,
  - a first processing section in a check mode different from the running mode for moving the movable flange to a position where movement of the movable flange is restricted by the restriction section, and for storing a detection value of the flange position detection sensor detected with the movable flange moved to that position in a second storage section, and
  - a second processing section in the check mode for deriving correlation between the position of the movable flange in the belt type continuously variable transmission and the detection value of the flange position detection sensor based on the detection value of the flange position detection sensor stored in the second storage section by the first processing section and the reference correlation between the position of the movable flange and the detection value of the flange position detection sensor stored in the first storage section.

21. A vehicle comprising the belt type continuously variable transmission according to claim 20, wherein the running mode is only executed during a driving operation of the vehicle, and the check mode is only executed during a non-driving operation of the vehicle.

* * * * *